(12) United States Patent
Pereira Lourinho et al.

(10) Patent No.: US 11,180,173 B2
(45) Date of Patent: Nov. 23, 2021

(54) SEGMENTED MONOBLOCK CONTAINER WITH WHEELS

(71) Applicant: Joalpe Industria de Expositores S.A., Covilha (PT)

(72) Inventors: Nuno Goncalo Pereira Lourinho, Covilha (PT); Marco Joao Oliveira Pereira, Covilha (PT); Kevin Mickael Lopes Batista, Covilha (PT)

(73) Assignee: JOALPE INDUSTRIA DE EXPOSITORES S.A., Covilha (PT)

( * ) Notice: Subject to any disclaimer, the term of this patent is extended or adjusted under 35 U.S.C. 154(b) by 0 days.

(21) Appl. No.: 16/478,019

(22) PCT Filed: Jan. 5, 2018

(86) PCT No.: PCT/IB2018/050082
§ 371 (c)(1),
(2) Date: Jul. 15, 2019

(87) PCT Pub. No.: WO2018/127840
PCT Pub. Date: Jul. 12, 2018

(65) Prior Publication Data
US 2020/0122763 A1      Apr. 23, 2020

(30) Foreign Application Priority Data

Jan. 6, 2017  (PT) .......................................... 109833

(51) Int. Cl.
*B62B 3/16*        (2006.01)
*B62B 3/00*        (2006.01)
*B62B 3/14*        (2006.01)

(52) U.S. Cl.
CPC .............. *B62B 3/165* (2013.01); *B62B 3/001* (2013.01); *B62B 3/1492* (2013.01); *B62B 2501/065* (2013.01)

(58) Field of Classification Search
CPC ..... B62B 3/16; B62B 3/165; B62B 3/18–184; B62B 3/001; B62B 3/1492
See application file for complete search history.

(56) References Cited

U.S. PATENT DOCUMENTS 422,729 A * 3/1890 Clark ............................ 248/129
2,916,291 A * 12/1959 Young .................. B62B 3/1492
280/33.991

(Continued)

FOREIGN PATENT DOCUMENTS

DE        19924562 A1    11/2000
EP        2952407 A1     12/2015

(Continued)

OTHER PUBLICATIONS

International Search Report and Written Opinion dated May 8, 2018 for International Application No. PCT/IB2018/050082.

*Primary Examiner* — Erez Gurari
(74) *Attorney, Agent, or Firm* — Lucas & Mercanti, LLP

(57) ABSTRACT

The present application describes a monoblock container, with wheels, consisting of two compartments intended, for example, for product storage and transportation. The monoblock container is formed in one piece, which is divided in two compartments of distinct dimensions, favouring the segmentation of products to be stored/transported among said compartments.

4 Claims, 4 Drawing Sheets

(56) References Cited

U.S. PATENT DOCUMENTS

| | | | | |
|---|---|---|---|---|
| 3,048,420 | A * | 8/1962 | Umanoff | B62B 3/1492 |
| | | | | 280/62 |
| 3,052,484 | A * | 9/1962 | Huffman | B62B 1/12 |
| | | | | 280/654 |
| 3,326,571 | A * | 6/1967 | Levine | B62B 3/027 |
| | | | | 280/641 |
| 4,428,493 | A * | 1/1984 | McDonough | B65D 1/24 |
| | | | | 206/518 |
| 4,770,300 | A * | 9/1988 | Klein | B65D 21/062 |
| | | | | 206/506 |
| 4,883,177 | A * | 11/1989 | Galbani | B65H 49/38 |
| | | | | 206/391 |
| 5,301,991 | A * | 4/1994 | Chen | A63B 47/021 |
| | | | | 248/132 |
| 5,692,761 | A * | 12/1997 | Havlovitz | B62B 1/006 |
| | | | | 280/33.994 |
| 6,193,265 | B1 * | 2/2001 | Yemini | B60B 37/10 |
| | | | | 280/47.31 |
| 6,237,924 | B1 * | 5/2001 | Reiland | B62B 3/144 |
| | | | | 280/33.993 |
| 7,467,728 | B2 * | 12/2008 | Lundy | B44D 3/12 |
| | | | | 220/505 |
| 7,494,136 | B2 * | 2/2009 | Alves | A45C 3/04 |
| | | | | 280/33.991 |
| 7,594,667 | B2 * | 9/2009 | Overland | B62B 3/16 |
| | | | | 16/110.1 |
| D608,073 | S * | 1/2010 | Alves | B62B 1/006 |
| | | | | D34/24 |
| D631,222 | S * | 1/2011 | Gimeno | B62B 1/125 |
| | | | | D34/24 |
| D644,810 | S * | 9/2011 | Peota | D34/27 |
| 8,376,376 | B2 * | 2/2013 | Thibault | A47L 13/58 |
| | | | | 280/79.5 |
| D694,982 | S * | 12/2013 | Overland | D34/24 |
| 8,602,423 | B1 * | 12/2013 | Alexander | B62B 3/165 |
| | | | | 280/33.998 |
| 8,636,169 | B2 * | 1/2014 | Sampaio | B65D 25/2891 |
| | | | | 220/500 |
| 8,763,810 | B2 * | 7/2014 | Zorzo | A47L 13/58 |
| | | | | 206/516 |
| 8,764,032 | B1 * | 7/2014 | Dantice | B62B 3/14 |
| | | | | 280/47.35 |
| D715,512 | S * | 10/2014 | Subiros Berenguer | D34/24 |
| D773,770 | S * | 12/2016 | Olmos | D34/17 |
| 9,539,850 | B2 * | 1/2017 | Enguita | B44D 3/126 |
| 9,545,937 | B2 * | 1/2017 | Morcillo Barjola | B62B 3/165 |
| 10,077,138 | B2 * | 9/2018 | Albrecht | B65D 25/2897 |
| 10,266,190 | B2 * | 4/2019 | Stoeckle | B62B 1/006 |
| 10,538,362 | B2 * | 1/2020 | Sampaio | B65D 25/24 |
| D895,920 | S * | 9/2020 | Villanova Abadia | D34/21 |
| 2003/0213090 | A1 * | 11/2003 | Holsten | A47L 9/0018 |
| | | | | 15/323 |
| 2006/0103087 | A1 * | 5/2006 | Alcala Sebastian | A47F 10/04 |
| | | | | 280/47.26 |
| 2006/0201943 | A1 * | 9/2006 | Uffner | B60B 33/08 |
| | | | | 220/23.83 |
| 2006/0208439 | A1 * | 9/2006 | Depasquale | B62B 1/006 |
| | | | | 280/47.17 |
| 2006/0226154 | A1 * | 10/2006 | Lundy | B44D 3/121 |
| | | | | 220/507 |
| 2009/0019654 | A1 * | 1/2009 | Lingren | A47L 13/58 |
| | | | | 15/115 |
| 2010/0230916 | A1 * | 9/2010 | Gimeno Verdejo | B62B 3/16 |
| | | | | 280/33.998 |
| 2011/0095496 | A1 * | 4/2011 | Kassab Arabo | B62B 5/067 |
| | | | | 280/33.992 |
| 2012/0292222 | A1 * | 11/2012 | Zorzo | A47L 13/58 |
| | | | | 206/515 |
| 2013/0069326 | A1 * | 3/2013 | Padgett | B62B 3/146 |
| | | | | 280/47.35 |
| 2013/0285340 | A1 * | 10/2013 | Esteban Guallar | B62B 3/165 |
| | | | | 280/47.19 |
| 2014/0265184 | A1 * | 9/2014 | Lorenzo Rodriguez | B62B 3/1492 |
| | | | | 280/33.991 |
| 2015/0321688 | A1 * | 11/2015 | Morcillo Barjola | B62B 5/067 |
| | | | | 280/33.998 |
| 2020/0122763 | A1 * | 4/2020 | Pereira Lourinho | B62B 3/1492 |
| 2020/0247449 | A1 * | 8/2020 | Wolfe | B62B 3/005 |

FOREIGN PATENT DOCUMENTS

| | | |
|---|---|---|
| GB | 2419804 A | 5/2006 |
| GB | 2466926 A | 7/2010 |
| WO | 00/01531 A1 | 1/2000 |

* cited by examiner

SEGMENTED MONOBLOCK CONTAINER WITH WHEELS

CROSS-REFERENCE TO RELATED APPLICATIONS

This application is a 371 of PCT/IB2018/050082 filed Jan. 5, 2018, which claims the benefit of Portuguese Patent Application No. 109833 filed Jan. 6, 2017, both applications are incorporated herein by reference.

TECHNICAL DOMAIN

The present application describes a monoblock container with wheels, consisting of two compartments of different dimensions.

BACKGROUND

Nowadays, for example in shopping areas, regardless of their size, we realize the existence of several types of containers to assist in the purchasing process, being that, in recent years, a proliferation of several types of containers with wheels have been witnessed, such that to replace shopping cars of larger dimensions, ensuring greater convenience to the users of the same.

Various types of containers with wheels have been developed, in its majority with extensible handles, manoeuvred in a tilted way or in a straight line with wings, or even monoblock containers with pivoting or fixed wheels and fixed handle region, of larger capacity, which allows the observation of technical progress over the years.

However, as monoblock containers, that is to say, designed in one piece, they have a single storage compartment, thereby in certain cases due to its depth—since they tend to have body sides with a quite high height such that the storage volume can be increased—placing the products is difficult.

SUMMARY

Disclosed is a segmented monoblock container with wheels, characterized in that it comprises a main body made from a single piece of material, which is segmented such that it results in two compartments having distinct volumes, wherein each compartment is defined by a bottom surface and four lateral walls.

In a particular embodiment of the developed container, the bottom surface of the larger volume compartment comprises a mechanism to attach four wheels arranged on said surface equidistantly from each other.

In a particular embodiment of the developed container, the two wheels placed at the back part of the bottom surface are fixed and the two wheels placed at the front part of the bottom surface are of the pivoting type.

In a particular embodiment of the developed container, the constituting material is of the thermoplastic type.

In a particular embodiment of the developed container, the constituting material is polypropylene.

In a particular embodiment of the developed container, the back-lateral wall of the larger volume compartment is longer than the remaining ones, having arranged at its upper end, opposite to the end contacting the bottom surface of said compartment, a handle to manoeuvre the monoblock container.

In a particular embodiment of the developed container, the larger dimensions compartment has a volume of 50 L and the smaller dimensions compartment has a volume of 5 L.

DETAILED DESCRIPTION

The present application describes a monoblock container with wheels, which favours storage and transportation of products, for example in retail sales areas. It comprises two compartments of distinct dimensions, resulting from the segmentation of said container. By monoblock container it is meant a container made in one piece.

The main container segmentation is a new approach in relation to the state of the art of this type of containers, which from the start enables the user to differentiate articles to be stored, for example in a retail sales area context, splitting more sensitive foods from other ones of larger dimension, ensuring their quality without making use of other complementary and/or auxiliary ways of transporting products inside the stores. In effect, and in this particular exemplary scenario, the existence of two compartments in one same container ensures an optimization of the existing space allowing articles selection and storage according to their size and fragility, and represents an added value.

The container now developed comprises four wheels, coupled to the lower surface thereof, providing contact with the floor and its displacement. At the back part of the container's lower surface, the wheels are fixed, enabling the user to drive it with inclination, and the front wheels are pivotal which enables driving the container in a straight position using, in this way, the 4 wheels and ensuring its stability. In effect, the larger volume compartment's back-lateral wall in which axis the back wheels, fixed, are installed, presents a longer length than the remaining walls. At its upper end, opposite to the lower end contacting the bottom surface of said compartment, such wall has a handle favouring the handling of the container herein presented.

The container is produced with thermoplastic materials, for example polypropylene, through an injection process.

DESCRIPTION OF THE FIGURES

For an easier understanding of the present application figures are appended, which depict preferred implementations that, however, are not meant to limit the art disclosed herein.

DESCRIPTION OF EMBODIMENTS

Figure 1:
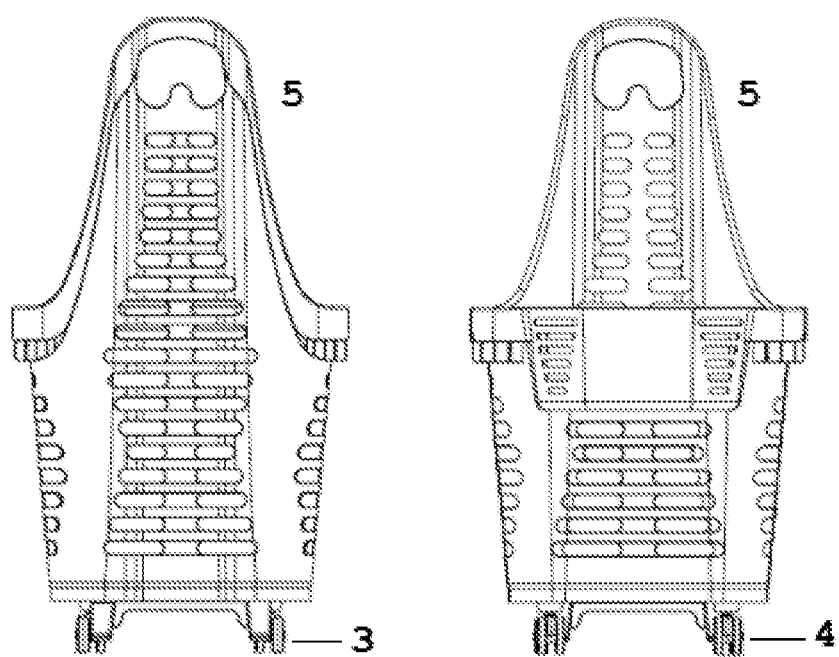
FIG. 1 illustrates a schematic representation of a particular embodiment front view of the monoblock container, wherein the reference signs mean:
3—fixed back wheels;
4—pivoting front wheels;
5—monoblock container.

Referring to the figures, some embodiments will now be described in a more detailed way, which are not meant, however, to limit the scope of the present application.

In an embodiment of the developed double monoblock container (5) with wheels, said container comprises two joined compartments (1 and 2), resultant from the main body division in two, having different dimensions, and including in total two bottoms and eight walls. A first compartment (1) has a capacity for up to 50 L, whereas the second compartment (2) has a capacity for up to 5 L. Furthermore, the developed container (5) has four wheels allowing its displacement on flat surfaces and or with a slight inclination. At the lower part of the recipient (5) the back wheels (3) are fixed, enabling driving the same with inclination. The front wheels (4) are pivotal favouring driving the container (5) in the vertical position using, in this way, the 4 wheels and ensuring its stability.

Figure 2:
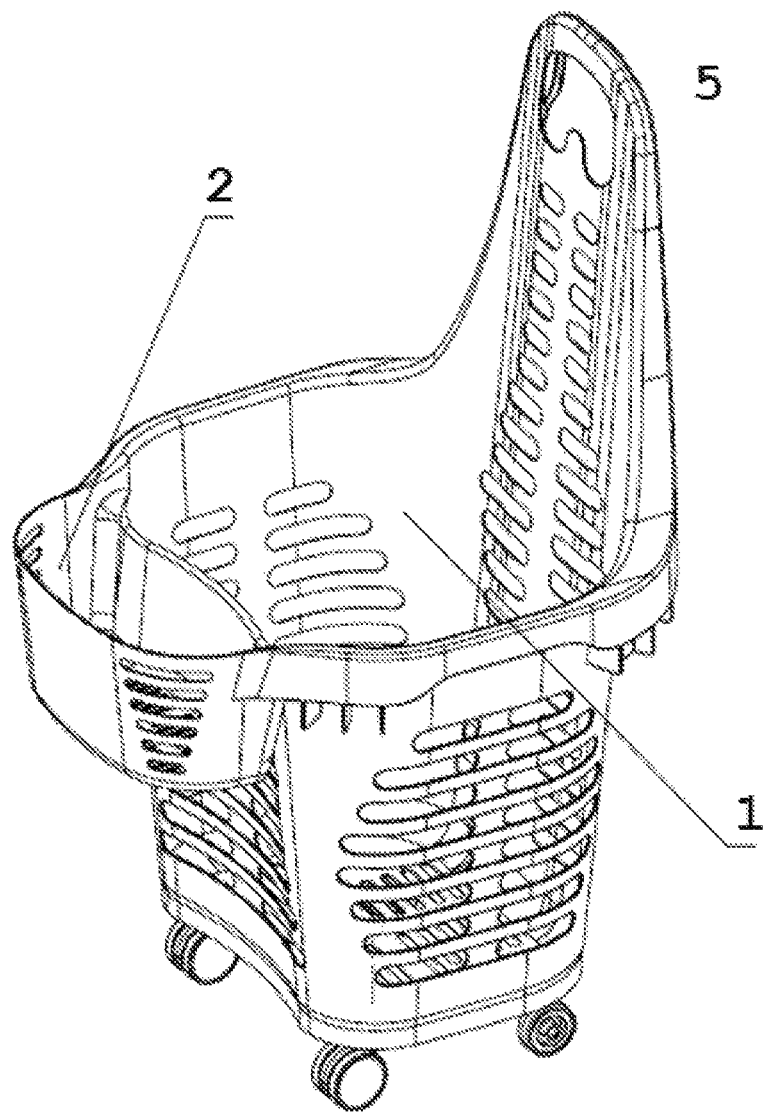
FIG. 2 illustrates a schematic representation of an upper view of the developed monoblock container (5), wherein the reference signs mean:
1—represents compartment one;
2—represents compartment two.
Figure 3:
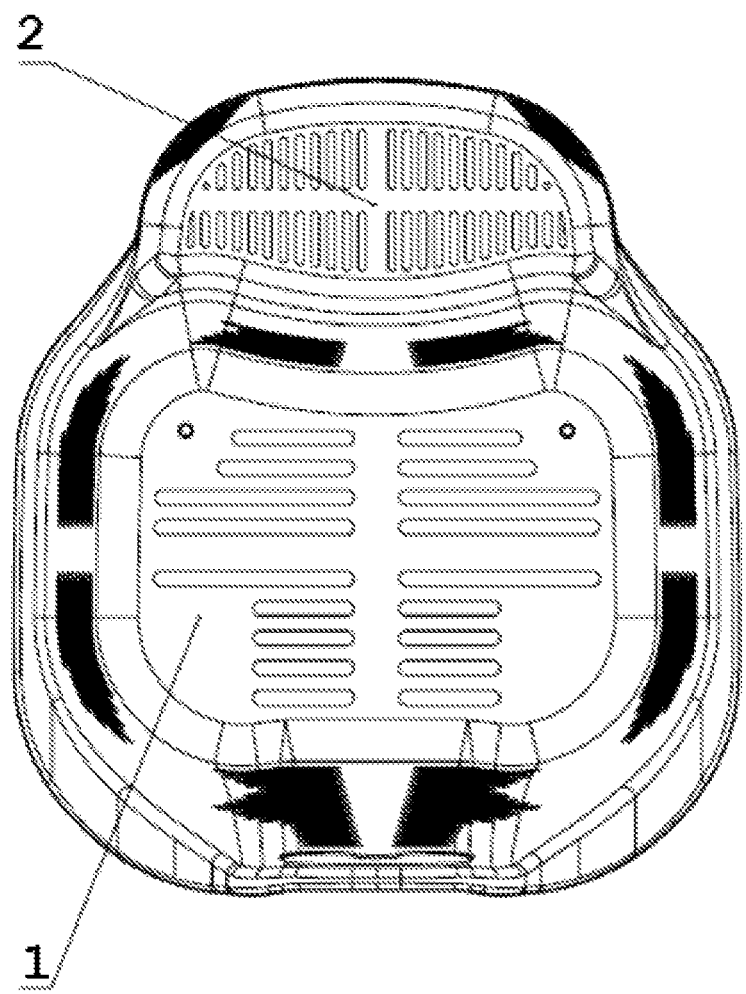
FIG. 3 illustrates a schematic representation of the two compartments view of a particular embodiment of the developed monoblock container, wherein the reference signs mean:
1—represents the compartment with capacity for 50 L;
2—represents the compartment with capacity for 5 L.
Figure 4:
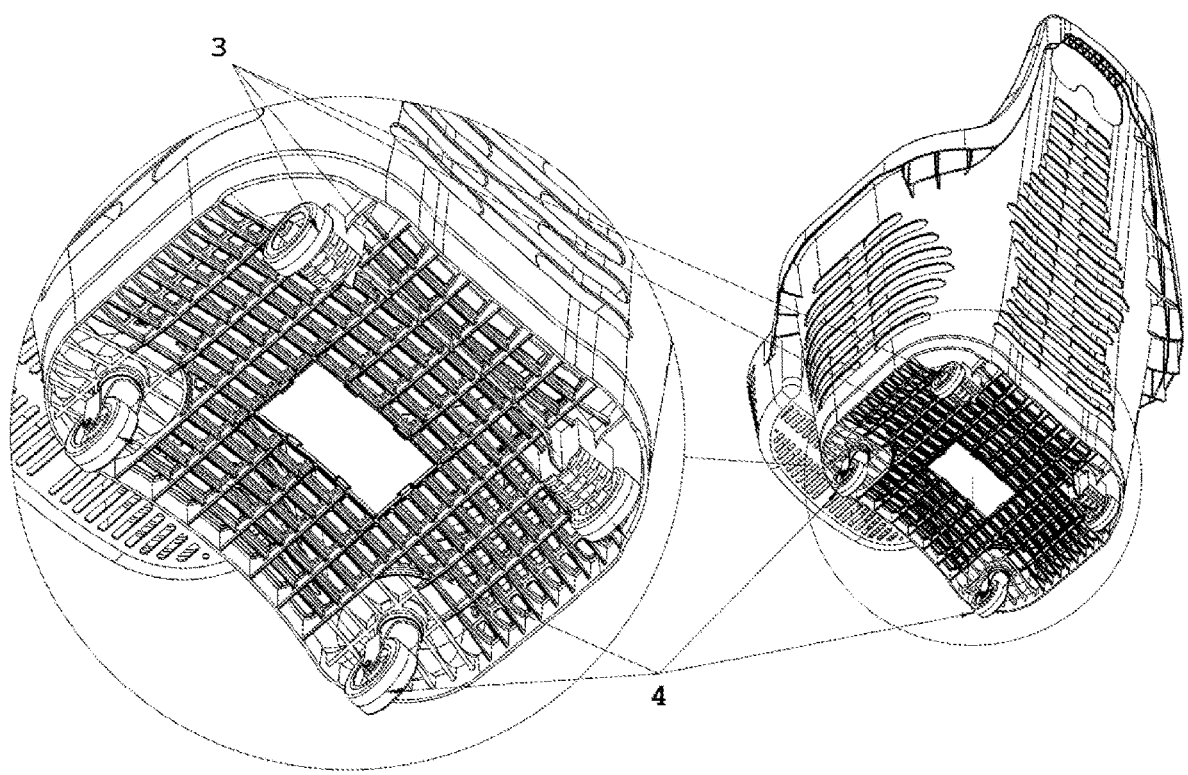
FIG. 4 illustrates a schematic representation of the developed monoblock container bottom view, wherein the reference signs mean:
3—fixed back wheels;
4—pivoting front wheels.

As illustrated in FIGS. 1-3, a practical scenario of the developed double monoblock container (5) application is in commercial retail areas.

The present description is not, naturally, in any way restricted to the embodiments presented herein and a person with average knowledge in the field may foresee many possibilities for modification thereof without departing from the main idea, as per defined in the claims. The preferred embodiments above described are obviously combinable with each other. The following claims further define preferred embodiments.

The invention claimed is:

1. A segmented monoblock container with wheels comprising a main body made from a single piece of material, which is segmented in two compartments with distinct volumes, a first compartment being of relatively larger volume than that of a second compartment, wherein the first compartment is adjoined with the second compartment, wherein each compartment is defined by a bottom surface and four lateral walls, wherein the first compartment comprises a first fixed wheel and a second fixed wheel placed at a back part of the bottom surface and a first pivoting wheel and a second pivoting wheel are placed at a front part of the bottom surface, wherein the first fixed wheel and the first pivoting wheel is the same as a distance between the second fixed wheel and the second pivoting wheel on the bottom surface of the first compartment, and wherein one of the four lateral walls of the first compartment is longer than the remaining lateral walls, having a handle arranged at its upper end, opposite to an end contacting the bottom surface of said compartment, to maneuver the container.

2. The segmented monoblock container according to claim 1, wherein the container's material is of the thermoplastic type.

3. The segmented monoblock container according to claim 2, wherein the container's material is polypropylene.

4. The segmented monoblock container according to claim 1, wherein the first compartment has a volume of 50 L capacity and the second compartment has a volume of 5 L capacity.

* * * * *